United States Patent
Ishiguro et al.

(10) Patent No.: US 9,932,651 B2
(45) Date of Patent: *Apr. 3, 2018

(54) THICK-WALLED HIGH-STRENGTH SEAMLESS STEEL PIPE WITH EXCELLENT SOUR RESISTANCE FOR PIPE FOR PIPELINE, AND PROCESS FOR PRODUCING SAME

(75) Inventors: Yasuhide Ishiguro, Aichi (JP); Mitsuo Kimura, Chiba (JP); Kenichiro Eguchi, Aichi (JP); Hiroshi Yokogawa, Aichi (JP); Tadao Katagiri, Tokyo (JP); Masahito Tanaka, Beijing (CN)

(73) Assignee: JFE Steel Corporation, Tokyo (JP)

(*) Notice: Subject to any disclaimer, the term of this patent is extended or adjusted under 35 U.S.C. 154(b) by 1103 days.

This patent is subject to a terminal disclaimer.

(21) Appl. No.: 14/129,810

(22) PCT Filed: Jun. 29, 2012

(86) PCT No.: PCT/JP2012/067254
§ 371 (c)(1),
(2), (4) Date: Dec. 27, 2013

(87) PCT Pub. No.: WO2013/002418
PCT Pub. Date: Jan. 3, 2013

(65) Prior Publication Data
US 2014/0137992 A1    May 22, 2014

(30) Foreign Application Priority Data
Jun. 30, 2011    (JP) ................................ 2011-146131

(51) Int. Cl.
*C21D 8/08*    (2006.01)
*C21D 9/08*    (2006.01)
(Continued)

(52) U.S. Cl.
CPC ............... *C21D 9/085* (2013.01); *C21D 1/25* (2013.01); *C22C 38/001* (2013.01); *C22C 38/02* (2013.01);
(Continued)

(58) Field of Classification Search
CPC ...... C21D 6/00–6/04; C21D 9/08–9/14; C22C 38/00–38/60
See application file for complete search history.

(56) References Cited

U.S. PATENT DOCUMENTS 9,493,865 B2 * 11/2016 Kami ........................ C21D 1/25
2014/0007994 A1 * 1/2014 Sakamoto .............. C21D 6/002
148/605
(Continued)

FOREIGN PATENT DOCUMENTS

EP    1 876 254 A1    1/2008
JP    H07166293 A    6/1995
(Continued)

OTHER PUBLICATIONS

Supplementary European Search Report for Application No. EP 12 80 5050 dated Aug. 5, 2015.
(Continued)

*Primary Examiner* — Veronica F Faison
(74) *Attorney, Agent, or Firm* — RatnerPrestia

(57) ABSTRACT

A heavy wall and high strength seamless steel pipe having high sour resistance is provided. In particular, a quenching and tempering treatment is conducted to adjust the yield strength to be higher than 450 MPa and adjust the Vickers hardness HV5 that can be measured at an outermost side or an innermost side of the pipe under a 5 kgf load (test load: 49 N) to be 250 HV5 or less.

18 Claims, 4 Drawing Sheets

(51) Int. Cl.
| | |
|---|---|
| *C22C 38/00* | (2006.01) |
| *C22C 38/02* | (2006.01) |
| *C22C 38/04* | (2006.01) |
| *C22C 38/06* | (2006.01) |
| *C22C 38/14* | (2006.01) |
| *C22C 38/20* | (2006.01) |
| *C22C 38/22* | (2006.01) |
| *C22C 38/24* | (2006.01) |
| *C22C 38/28* | (2006.01) |
| *C22C 38/38* | (2006.01) |
| *C22C 38/40* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/58* | (2006.01) |
| *F16L 9/02* | (2006.01) |
| *C21D 1/25* | (2006.01) |
| *C21D 1/63* | (2006.01) |
| *C21D 8/10* | (2006.01) |

(52) U.S. Cl.
CPC .............. *C22C 38/04* (2013.01); *C22C 38/06* (2013.01); *C22C 38/14* (2013.01); *C22C 38/20* (2013.01); *C22C 38/22* (2013.01); *C22C 38/24* (2013.01); *C22C 38/28* (2013.01); *C22C 38/38* (2013.01); *C22C 38/40* (2013.01); *C22C 38/44* (2013.01); *C22C 38/46* (2013.01); *C22C 38/48* (2013.01); *C22C 38/50* (2013.01); *C22C 38/58* (2013.01); *F16L 9/02* (2013.01); *C21D 1/63* (2013.01); *C21D 8/105* (2013.01); *C21D 2261/00* (2013.01)

(56) References Cited

U.S. PATENT DOCUMENTS

2014/0216609 A1* 8/2014 Nakata .................... C21D 6/00
                                                                         148/505
2014/0352836 A1* 12/2014 Eguchi .................... C21D 8/10
                                                                         138/177

FOREIGN PATENT DOCUMENTS

| JP | 11-50148 A | 2/1999 |
|---|---|---|
| JP | 11-236651 A | 8/1999 |
| JP | 2004-143593 A | 5/2004 |
| JP | 2004-176172 A | 6/2004 |
| JP | 2006-274350 A | 10/2006 |
| JP | 2007016302 A | 1/2007 |
| JP | 2007-260716 A | 10/2007 |
| JP | 2008-23569 A | 2/2008 |
| WO | WO 2006/104023 A1 | 10/2006 |

OTHER PUBLICATIONS

International Search Report dated Oct. 2, 2012, application No. PCT/JP2012/067254.
ISO 3183, "Petroleum and natural gas industries—Steel pipe for pipeline transportation systems," Mar. 15, 2007, pp. 1-143, Second Edition.
Japanese Office Action for Japanese Application No. 2012-145097, dated Nov. 4, 2015, including Concise Statement of Relevance of Office Action, 6 pages.
European Communication for European Application No. 12 805 050.7, dated Sep. 15, 2016, 3 pages.

* cited by examiner

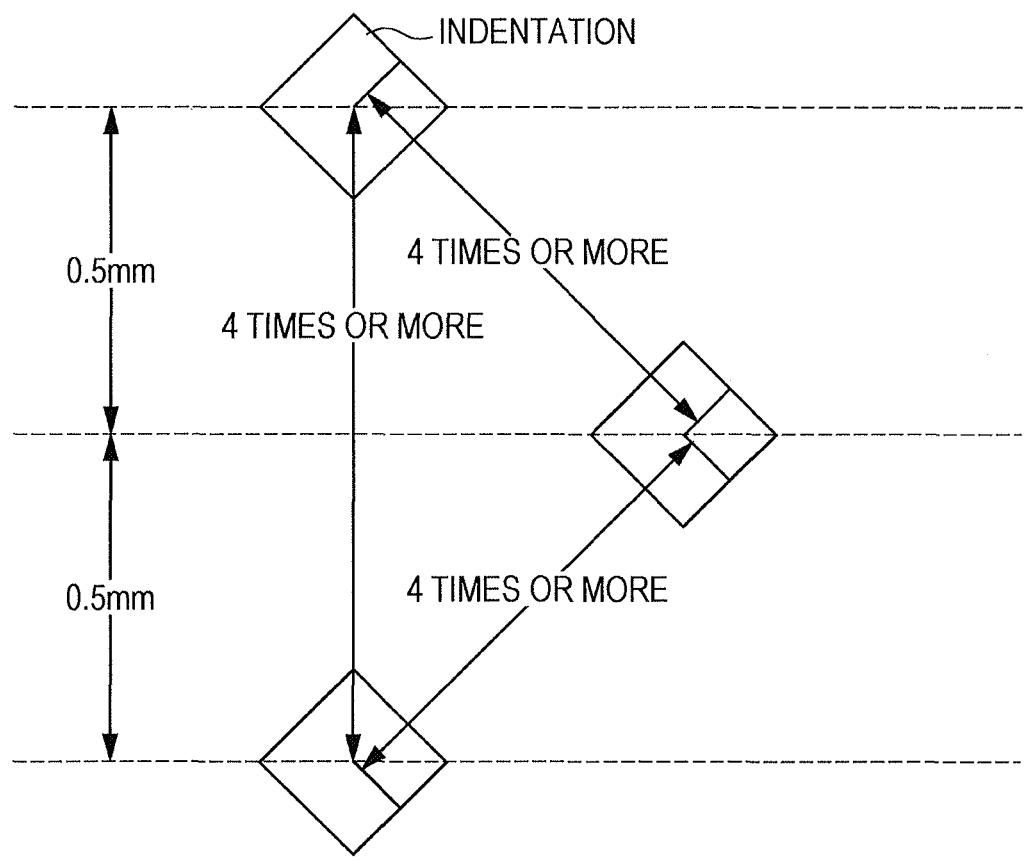

THICK-WALLED HIGH-STRENGTH SEAMLESS STEEL PIPE WITH EXCELLENT SOUR RESISTANCE FOR PIPE FOR PIPELINE, AND PROCESS FOR PRODUCING SAME

CROSS REFERENCE TO RELATED APPLICATIONS

This is the U.S. National Phase application of PCT/JP2012/067254, filed Jun. 29, 2012, which claims priority to Japanese Patent Application No. 2011-146131, filed Jun. 30, 2011, the disclosures of each of these applications being incorporated herein by reference in their entireties for all purposes.

TECHNICAL FIELD OF THE INVENTION

The present invention relates to a heavy wall and high strength seamless steel pipe (or tube, hereinafter called pipe) suitable for line pipes for transporting crude oil, natural gas, etc., and in particular to further improvements of its sour resistance.

BACKGROUND OF THE INVENTION

Depletion of crude oil and natural gas has been a concern in recent years. Oil fields and gas fields located deeper than conventional fields and known as "deep-water" oil fields and gas fields located 2000 m under the sea or deeper are now being exploited. Deep-water oil fields and gas fields operate in severe corrosion environments that contain $CO_2$, $H_2S$, $Cl^-$, and the like in high concentrations. Accordingly, steel materials used in such oil fields and gas fields are required to exhibit high strength and high corrosion resistance.

Crude oil or natural gas mined from an oil field or a gas field through oil country tubular goods (OCTG) or the like is transported to ground (or sea base) facilities through gathering lines laid along the ocean floor. Accordingly, the line pipes and other components used are required to exhibit strength that can withstand water pressure and an ability to sink by their own weights. In this regard, the wall thickness of the line pipes used exceeds 20 mm and in some cases heavy wall seamless steel pipes having a thickness of 35 mm are used. These heavy wall seamless pipes are required to exhibit higher strength, high corrosion resistance, and a good girth welding property.

To meet these requirements, for example, Patent Literature 1 and Patent Literature 2 describe a high-strength seamless steel pipe that has a composition including C: 0.03 to 0.11%, Si: 0.05 to 0.5%, Mn: 0.8 to 1.6%, P: 0.025% or less, S: 0.003% or less, Ti: 0.002 to 0.017%, Al: 0.001 to 0.10%, Cr: 0.05 to 0.5%, Mo: 0.02 to 0.3%, V: 0.02 to 0.20%, Ca: 0.0005 to 0.005%, N: 0.008% or less, and O: 0.004% or less and has a bainite and/or martensite microstructure with ferrite precipitating in grain boundaries. According to a technique described in Patent Literature 1, a steel slab having the aforementioned composition is formed into a seamless steel pipe by hot rolling. The seamless steel pipe is subjected to a quenching treatment of cooling the seamless steel pipe at a cooling rate of 5° C./s or more from a quenching start temperature of (Ar3 point+50° C.) to 1100° C., and then to tempering at 550° C. to Ac1 point so as to form a high-strength seamless steel pipe that has a yield strength of 483 MPa or more and excellent hydrogen induced cracking resistance (hereinafter also referred to as HIC resistance).

Patent Literature 3 describes a method for producing a heavy wall seamless steel pipe for line pipes that have high strength and good toughness. The technique described in Patent Literature 3 sequentially performs the following steps: a step of causing a molten steel to solidify into a billet having a round cross-section by continuous casting, the molten steel containing C: 0.03 to 0.08%, Si: 0.25% or less, Mn: 0.3 to 2.5%, Al: 0.001 to 0.10%, Cr: 0.02 to 1.0%, Ni: 0.02 to 1.0%, Mo: 0.02 to 1.2%, Ti: 0.004 to 0.010%, N: 0.002 to 0.008%, at least one of Ca, Mg, and REM: 0.0002 to 0.005% in total, V: 0 to 0.08%, Nb: 0 to 0.05%, and Cu: 0 to 1.0%; a step of cooling the billet to room temperature at an average cooling rate from 1400° C. to 1000° C. of 6° C./min or more; a step of heating the billet to 1150° C. to 1280° C. at an average heating rate from 550° C. to 900° C. of 15° C./min or less and preparing a seamless steel pipe by piercing and rolling; a step of continuously conducting forced cooling to a temperature of 100° C. or lower at an average cooling rate from 800 to 500° C. of 8° C./sec or more after the seamless steel pipe was soaked at 850 to 1000° C. immediately after preparation of the seamless steel pipe, after the seamless steel pipe was cooled after the preparation and then heated to 850 to 1000° C., or immediately after preparation of the seamless steel pipe; and a tempering process of tempering the pipe at a temperature in the range of 500° C. to 690° C. According to the technique described in Patent Literature 3, a rectangular bloom or slab may be formed by continuous casting instead of the round billet and then formed into a round billet by forging or rolling.

PATENT LITERATURE

PTL 1: Japanese Unexamined Patent Application Publication No. 2004-176172

PTL 2: Japanese Unexamined Patent Application Publication No. 2004-143593

PTL 3: Japanese Unexamined Patent Application Publication No. 2006-274350

SUMMARY OF THE INVENTION

Even with the techniques disclosed in Patent Literatures 1 to 3, the strength (hardness) of steel pipe surface layers is inevitably high. According to the techniques disclosed in Patent Literatures 1 to 3, a steel having a C—Mn-based composition is used. When a quenching treatment such as water cooling is performed in the process of cooling after rolling, the surface layers undergo rapid cooling and thus are easily quenched, resulting in an increased hardness. Sometimes the hardness exceeds the value prescribed in API standards or DNV-OS-F101 code. In contrast, the center portion of the wall is not as easily quenched due to a low cooling rate. This may result in inclusion of quenching-unrelated metallic structures such as ferrite.

A steel having a C—Mn-based composition has a transformation characteristic (continuous cooling transformation (CCT) diagram) in which the ferrite nose and the bainite nose are shifted toward the shorter time side. Assuming that an ideal water cooling (nucleate boiling mode) is achieved, the cooling rate in the surface layer is 1000° C./sec or more and the cooling rate in the wall center portion of the steel pipe having a wall thickness of 30 mm is about 20 to 30° C./sec. As a result, while the surface layers come to have a quenched microstructure of martensite, bainite, etc., the center portion of the wall may contain a quenching-unrelated metallic structure (or non-hardened structure) such as ferrite. Inevitably, the hardness distribution in the wall thickness direction is such that the surface layers and nearby regions have high hardness. Thus, the hardness distribution in the wall thickness direction has a U-shape profile as shown in FIG. 2. This hardness distribution in the wall thickness direction does not completely vanish even if a tempering treatment is performed although the hardness level may decrease.

For example, in the case where the resistance to sulfide stress cracking (SSC) of a steel pipe is to be evaluated by Method A prescribed in NACE TM0177-2005, a round bar type specimen prepared by removing surface layers is used. Thus, even a steel pipe having a hardness distribution in the wall thickness direction in which the surface layers and nearby regions exhibit high hardness is evaluated as having good SSC resistance. However, in the case where evaluation is conducted through Method C test prescribed in NACE TM0177-2005 or a four-point bending test method prescribed in ASTM standards, etc., a specimen that includes a surface layer having high hardness is used and thus rupture sometimes results. As a result, the steel pipe is evaluated as having degraded SSC resistance. For example, regarding a Steel pipe required to exhibit sour resistance, DNV-OS-F101 code requires that the hardness at a position 1.5 mm from the surface satisfy 250 HV10 or less. However, even a steel pipe that has a hardness of 250 HV10 or less at a position 1.5 mm from the surface may undergo rupture in a severe corrosion environment if the hardness of the surface layer on the outer side of that position is higher than 250 HV. This means that the steel pipe has low SSC resistance.

The present invention aims to address the problems of the related art described above and provides a heavy wall and high strength seamless steel pipe having high sour resistance and a method for producing the same. It should be noted that the "heavy wall and high strength seamless steel pipe" here refers to a seamless steel pipe having a strength exceeding 450 MPa (65 ksi) in terms of yield strength YS. "Heavy wall" means the thickness of the wall is 10 mm or more, preferably 15 mm or more, and more preferably 25 mm or more. The "sour resistance" refers to characteristics that include the HIC resistance evaluated in accordance with NACE TM0284 and the SSC resistance evaluated in accordance with NACE TM0177 or ASME G39.

The inventors of the present invention have conducted extensive studies on various factors related to the sour resistance in order to achieve the object described above. As a result, they have found that the sour resistance improves notably when the hardness of a portion (surface layer) that comes into direct contact with a corrosion environment is suppressed to a low level. In other words, to be more specific, they have found that it significantly contributes to improving the sour resistance to suppress the Vickers hardness to 250 HV5 or less at the outermost side or the innermost side of the pipe (also refereed to as pipe surface layer) that can be measured under a 5 kgf load (test load 49 N).

The inventors have found that, particularly for a steel pipe having a U-shape hardness distribution in which the hardness increases from the center toward the surfaces in the wall thickness direction, it is preferable to remove the outer surface layer and the inner surface layer of the pipe by pickling, a shot blasted treatment, or the like or further performing griding so that the hardness of the surface layers is 250 HV5 or less.

The inventors have also found that, even for a steel pipe having an M-shape hardness distribution in the wall thickness direction as shown in FIG. 3 in which the hardness is low at the surface layers and reaches the maximum at a position at a particular depth from the surface, it is preferable to adjust the hardness of the surface layers of the pipe to 250 HV5 or less as in Case 1 in order to significantly improve the sour resistance. The inventors have also found that in order to further improve the sour resistance, the maximum hardness in the M-shape distribution is preferably adjusted to 250 HV5 or less as in Case 2.

The inventors have performed further investigations and contemplated that the M-shape hardness distribution in the wall thickness direction could be adjusted by conducting surface decarburization that involves controlling the heating temperature, the holding time, the atmosphere gas, etc., of hot rolling, the heating temperature, holding time, atmosphere gas, etc., of quenching, and controlling the heating temperature, holding time, atmosphere gas, etc., of tempering. They also contemplated that the hardness distribution could be controlled by forming a surface scale during a heat treatment and then removing the area of maximum hardness as a scale after quenching; or by decreasing the hardness through partial tempering such as conducting tempering only in the surface layers. The inventors have found that controlling the heating time, the holding time, the atmosphere gas, etc., during quenching and controlling cooling for quenching are most efficient for forming an M-shape hardness distribution in the wall thickness direction described above.

The region in which the hardness is decreased by surface decarburization is preferably a region about 2.5 to 3.0 mm from the surface layer. This is because when the region in which the hardness is decreased by surface decarburization is thicker than the region about 2.5 to 3.0 mm from the surface layer, the steel pipe strength decreases due to decarburization and the mechanical properties are adversely affected. This is particularly so in heavy wall materials having a wall thickness of 20 mm or more. The influence is particularly strong when an arc-formed tensile test piece as cut out from a pipe is used.

The present invention has been made on the basis of the above-described findings and further investigations. Embodiments of the present invention can be summarized as follows:

(1) A heavy wall and high strength seamless steel pipe for line pipes having high sour resistance, the heavy wall and high strength seamless steel pipe having a yield strength exceeding 450 MPa and prepared by performing a quenching and tempering treatment, wherein a Vickers hardness HV5 that can be measured at an outermost side or an innermost side of the pipe under a 5 kgf load (test load: 49 N) is 250 HV5 or less.

(2) The heavy wall and high strength seamless steel pipe for line pipes according to (1), wherein a hardness distribution across the entire region of the heavy wall and high strength seamless steel pipe in a wall thickness direction has an M-shape profile.

(3) The heavy wall and high strength seamless steel pipe for line pipes according to (1), wherein a hardness distribution across the entire region of the heavy wall and high strength seamless steel pipe in a wall thickness direction has a U-shape profile.

(4) The heavy wall and high strength seamless steel pipe for line pipes according to (2), wherein the hardness distribution across the entire region of the heavy wall and high strength seamless steel pipe in a wall thickness direction has the M-shape profile and a maximum hardness in terms of a Vickers hardness HV5 measured under a 5 kgf load (test load: 49 N) is 250 HV5 or less.

(5) The heavy wall and high strength seamless steel pipe for line pipes according to any one of (1) to (4), wherein the seamless steel pipe has a composition that contains, in terms of mass %, C: 0.03 to 0.15%, Si: 0.02 to 0.5%, Mn: 0.7 to 2.5%, P: 0.020% or less, S: 0.003% or less, Al: 0.01 to 0.08%, Ti: 0.005 to 0.05%, N: 0.005% or less, and the balance being Fe and unavoidable impurities, where Ti and N are contained to satisfy expression (1) below:

$$N \leq Ti \times 14/48 \leq N+10 \quad (1)$$

(Ti and N represent contents of respective elements (mass ppm)).

(6) The heavy wall and high strength seamless steel pipe for line pipes according to (5), wherein the composition further contains, in terms of mass %, at least one selected from Cr: 0.5% or less, Mo: 0.3% or less, Ni: 0.3% or less, Cu: 0.3% or less, V: 0.05% or less, and Nb: 0.05% or less.

(7) The heavy wall and high strength seamless steel pipe for line pipes according to (5) or (6), wherein the composition further contains, in terms of mass %, Ca: 0.002% or less.

(8) A method for producing a heavy wall and high strength seamless steel pipe for line pipes having high sour resistance, the method comprising performing a quenching treatment and a tempering treatment on a crude steel pipe so as to form a product steel pipe having a yield strength exceeding 450 MPa, wherein the crude steel pipe is a seamless steel pipe that has a composition that contains, in terms of mass %, C: 0.03 to 0.15%, Si: 0.02 to 0.5%, Mn: 0.7 to 2.5%, P: 0.020% or less, S: 0.003% or less, Al: 0.01 to 0.08%, Ti: 0.005 to 0.05%, N: 0.005% or less, and the balance being Fe and unavoidable impurities, where Ti and N are contained to satisfy expression (1) below:

$$N \leq Ti \times 14/48 \leq N+10 \quad (1)$$

(Ti and N represent contents of respective elements (mass ppm)); the quenching treatment includes performing heating at a temperature equal to or higher than the Ac3 transformation point and then performing rapid cooling; and after the quenching treatment, surface layers are ground from surfaces by a depth of 0.3 mm or more in a wall thickness direction and then the tempering treatment is performed.

(9) A method for producing a heavy wall and high strength seamless steel pipe for line pipes having high sour resistance, the method comprising performing a quenching treatment and a tempering treatment on a crude steel pipe so as to form a product steel pipe having a yield strength exceeding 450 MPa, wherein the crude steel pipe is a seamless steel pipe that has a composition that contains, in terms of mass %, C: 0.03 to 0.15%, Si: 0.02 to 0.5%, Mn: 0.7 to 2.5%, P: 0.020% or less, S: 0.003% or less, Al: 0.01 to 0.08%, Ti: 0.005 to 0.05%, N: 0.005% or less, and the balance being Fe and unavoidable impurities, where Ti and N are contained to satisfy expression (1) below:

$$N \leq Ti \times 14/48 \leq N+10 \quad (1)$$

(Ti and N represent contents of respective elements (mass ppm)); and the quenching treatment includes performing heating and then performing rapid cooling, the heating includes holding a heating temperature equal to or higher than the Ac3 transformation point for 120 seconds or more in an air atmosphere, and the rapid cooling includes performing a water-cooling treatment in a nucleate boiling region.

(10) The method for producing a heavy wall and high strength seamless steel pipe for line pipes according to (9), wherein the rapid cooling includes, instead of performing the water-cooling treatment in a nucleate boiling region, performing water-cooling in a film boiling region and then performing water-cooling in a nucleate boiling region.

(11) The method for producing a heavy wall and high strength seamless steel pipe for line pipes according to any one of (8) to (10), wherein the heating is performed through a heating furnace injection system, an electric resistance heating system, or an induction heating system.

(12) The method for producing a heavy wall and high strength seamless steel pipe for line pipes according to any one of (8) to (11), wherein the composition further contains, in terms of mass %, at least one selected from Cr: 0.5% or less, Mo: 0.3% or less Ni: 0.3% or less, Cu: 0.3% or less, V: 0.05% or less, and Nb: 0.05% or less.

(13) The method for producing a heavy wall and high strength seamless steel pipe for line pipes according to any one of (8) to (12), wherein the composition further contains, in terms of mass %, Ca: 0.002% or less.

According to the present invention, heavy wall and high strength seamless steel pipes suitable for line pipes and having high sour resistance can be stably produced and distinctive industrial advantages are provided.

BRIEF DESCRIPTION OF THE DRAWINGS

FIG. 4 is a schematic diagram showing a method for measuring a hardness distribution in a wall thickness direction.

DETAILED DESCRIPTION OF EMBODIMENTS OF THE INVENTION

A heavy wall and high strength seamless steel pipe of an embodiment of the present invention is prepared by performing a quenching and tempering treatment and has a yield strength exceeding 450 MPa. The "yield strength exceeding 450 MPa" also refers to the cases in which the pipe has a strength equal to or higher than the "X65" strength grade used in the field of line pipes.

Figure 1:
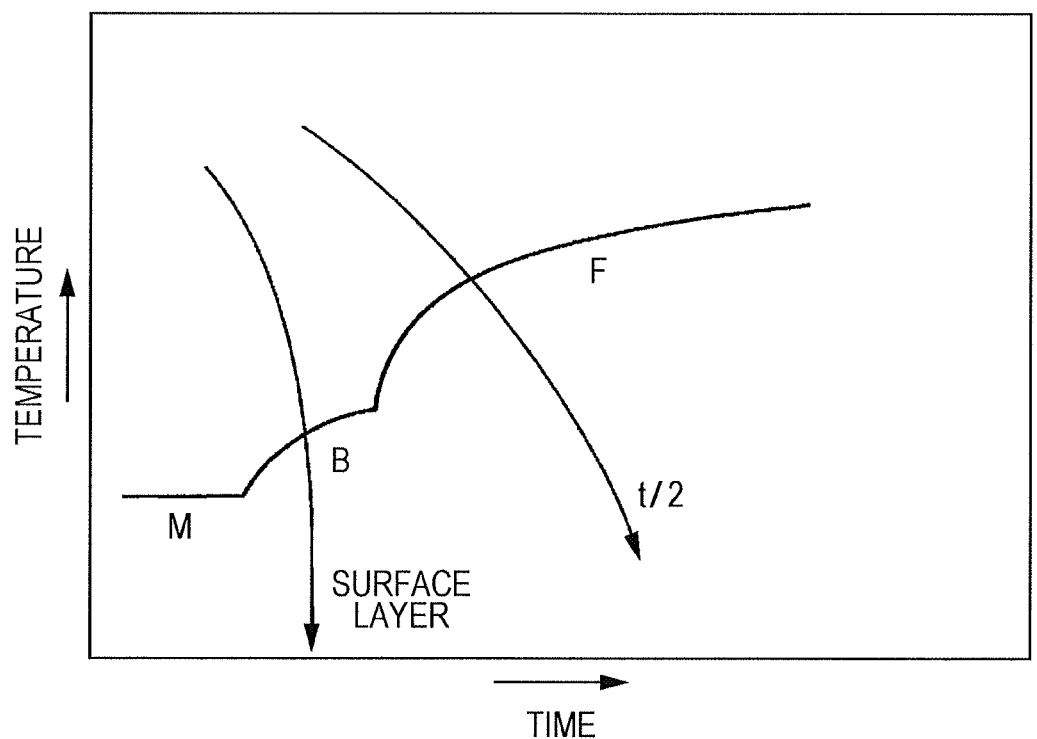
FIG. 1 is a schematic diagram showing a transformation characteristic of various parts of a C—Mn-based seamless steel pipe exhibited by cooling for quenching.
Figure 2:
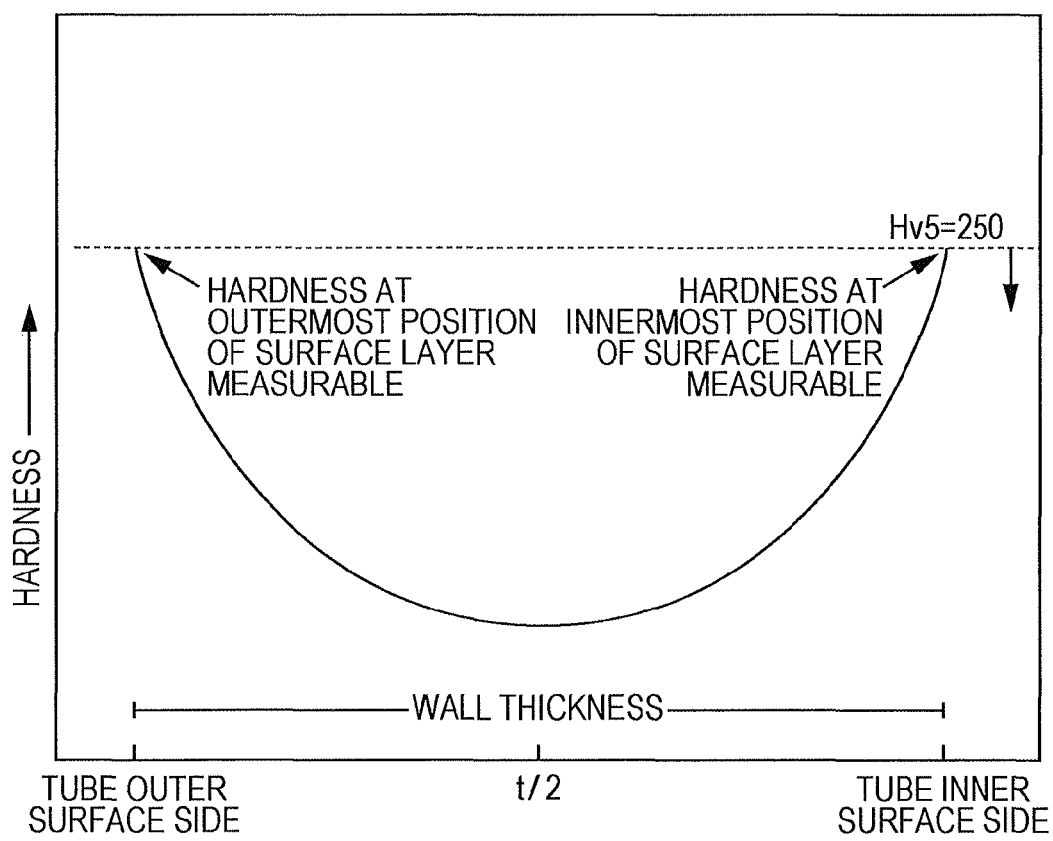
FIG. 2 is a schematic diagram showing an example of a U-shape hardness distribution of a quenched seamless steel pipe in the wall thickness direction.
Figure 3:
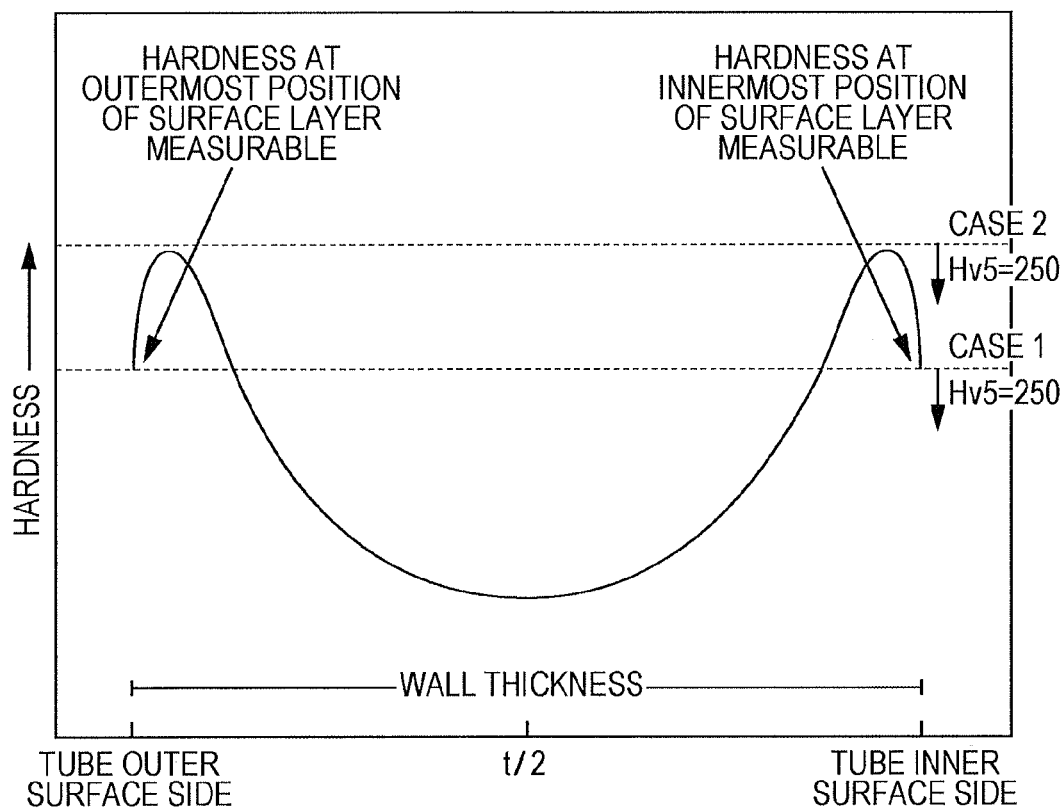
FIG. 3 is a schematic diagram showing an example of an M-shape hardness distribution of a quenched seamless steel pipe in the wall thickness direction.

A heavy wall and high strength seamless steel pipe of an embodiment of the present invention has a U-shape hardness distribution shown in FIG. 2, an M-shape hardness distribution shown in FIG. 3, or a flat distribution across the entire region in the wall thickness direction. Moreover, the hardness of a pipe surface layer in terms of Vickers hardness HV5 measured under a 5 kgf load (test load: 49 N) is 250 HV5 or less. The hardness distribution of the steel pipe of the present invention across the entire region in the wall thickness direction is measured in accordance with JIS Z 2244 with a Vickers hardness meter under a 5 kgf load (test load: 49 N) and the measurement is taken from the surface layer at 0.5 mm intervals across the entire region in the wall thickness direction.

Therefore, the position of the pipe surface layer is the position at the outermost side or the innermost side of the pipe at which the Vickers hardness can be measured under a 5 kgf load (test load: 49 N). JIS Z 2244 prescribes that an indentation be made in such a manner that the center of the indentation is spaced from the surface by a distance four times the size of the indentation. This means that, for a steel pipe having a hardness HV of about 250 targeted by the present invention, the position of the pipe surface layer is the position about 0.4 to 0.6 mm inward from the surface. Since the indentation becomes larger with the decreasing hardness, the position of the pipe surface layer shifts further inward as the hardness is decreased.

In the case where the hardness is measured under a 5 kgf load (test load: 49 N) from the surface layer at 0.5 mm intervals in the pipe wall thickness direction, the measurement deviates from the provisions of JIS Z 2244 if the indentations are excessively large in size and intervals between the indentations are excessively small. In such a case, in the present invention, the measurement is conducted in a zigzag manner as shown in FIG. 4 so that the distance between adjacent indentations is 4 times or more of the size of the indentation.

The "U-shape" hardness distribution in the wall thickness direction described in the present invention refers to, as apparent from FIG. 2, a distribution in which the hardness is low at of the center of the pipe wall and increases toward the outer surface side of the pipe and the inner surface side of the pipe. The "M-shape" hardness distribution in the wall thickness direction refers to, as apparent from FIG. 3, a distribution in which the hardness is low at the surfaces, reaches maximum at a position somewhat inward from the surface in the wall thickness direction, and decreases thereafter toward the center of the wall.

A seamless steel pipe having a U-shape hardness distribution shown in FIG. 2 can meet the HIC resistance and SCC resistance prescribed in NACE TM0284, NACE TM0177, ASME G39, etc., and exhibit significantly improved sour resistance as long as the hardness (also referred to as $HV_S$ hereinafter) of the pipe surface layers is 250 HV5 or less in terms of Vickers hardness HV5 measured under a 5 kgf load (test load: 49 N). When the hardness $HV_S$ of the pipe surface layer exceeds 250 HV5, cracking often occurs in tests prescribed in NACE TM0284, NACE TM0177, ASME G39, etc.

For a steel pipe having an M-shape hardness distribution in the wall thickness direction shown in FIG. 3, the hardness $HV_S$ of the pipe surface layer is 250 HV5 or less in terms of Vickers hardness HV5 measured under a 5 kgf load (test load: 49 N). As a result, cracking can be prevented in the tests prescribed in NACE TM0284, NACE TM0177, ASME G39, etc. The maximum hardness (hereinafter may be referred to as $HV_{MAX}$) in the M-shape hardness distribution in the wall thickness direction more preferably satisfies 250 HV5 or less in terms of Vickers hardness HV5 measured under a 5 kgf load (test load: 49 N) for further improving the sour resistance.

The starting point of the hardness distribution in the wall thickness direction described above is a surface layer (inner or outer) at which the hardness under a 5 kgf load (test load: 49 N) can be measured. It is often the case that a steel pipe exhibiting a U-shape hardness distribution in the wall thickness direction exhibits an M-shape hardness distribution if the hardness is measured under a lower load (test load). This is because when the surface layer region is soft, the surface layer at which the hardness can be measured under a high load comes to be positioned further inward and remote from the surface. In other words, this means that a steel pipe classified as having a U-shape hardness distribution in the wall thickness direction measured under a 5 kgf load (test load: 49 N) can be classified as having an M-shape distribution if the hardness is measured under a load less than 5 kgf because the measurement can be conducted on a soft region close to the surface.

A preferable composition of a heavy wall and high strength seamless steel pipe of the present invention having the above-mentioned properties is as follows. A heavy wall and high strength seamless steel pipe of the present invention has a composition that contains, in terms of mass %, C: 0.03 to 0.15%, Si: 0.02 to 0.5%, Mn: 0.7 to 2.5%, P: 0.020% or less, S: 0.003% or less, Al: 0.01 to 0.08%, Ti: 0.005 to 0.05%, N: 0.005% or less, and the balance being Fe and unavoidable impurities, where Ti and N are contained so as to satisfy expression (1)

$$N \leq Ti \times 14/48 \leq N+10 \tag{1}$$

(where Ti and N represent contents of the respective element (mass ppm)).

First, the reasons for limiting the composition are described. In the description below, "%" means "mass %" unless otherwise noted.

C: 0.03 to 0.15%

Carbon (C) contributes to increasing the strength of steel pipes through solid solution strengthening and improving hardenability but increases the hardness of the heat affected zones (HAZ) and weld metal zones during girth welding of the steel pipe. Thus, the C content is preferably reduced as much as possible. In order to attain the desired base metal strength, the C content needs to be 0.03% or more considering the effects of adding hardenability-improved elements such as Si and Mn. At a C content exceeding 0.15%, the HAZ hardness becomes excessively high and the sour resistance of the welded zones is adversely affected. Accordingly, the C content is preferably limited to be in the range of 0.03 to 0.15% and more preferably in the range of 0.06 to 0.12%. For usages, such as reel barges, in which the girth welded zone repeats winding and rewinding a number of times, the C content is more preferably 0.06 to 0.11% from the viewpoint of reducing the increase in hardness of the welded zones as much as possible. A preferable C content range is a C content range outside a hypo-peritec region where the volume expansion is large and the productivity is degraded. The hypo-peritec region changes depending on the contained components other than C and thus the exact region cannot be indicated when the composition system is not clear. However, the hypo-peritec region is often about C: 0.10 to 0.12%.

Si: 0.02 to 0.5%

Silicon (Si) contributes as a deoxidizing agent and contributes to increasing the strength of the steel pipe through solid solution strengthening. In order to attain these effects, a S content of 0.02% or more, which is beyond the impurity level, is needed. When the S content exceeds 0.5%, the toughness of the welded zones and the base metal is degraded. Thus, the Si content is preferably limited to be in the range of 0.02 to 0.5%.

Mn: 0.7 to 2.5%

Manganese (Mn) improves hardenability and has an effect of increasing the strength of a seamless steel pipe subjected to a quenching and tempering treatment. In order to attain the desired steel pipe strength while taking into account addition of hardenability-improving elements other than Mn, the Mn content needs to be 0.7% or more. In contrast, at a Mn content exceeding 2.5%, the hardness of the surface layers and the base metal and the hardness of the HAZ during girth welding exceed 250 HV and the sour resistance is degraded. Accordingly, the Mn content is preferably limited to be in the range of 0.7 to 2.5% and more preferably 0.7 to 1.5%.

Manganese (Mn) is added to make the microstructure of the steel pipe a mainly bainite microstructure (a microstructure that contains a bainite single phase or a bainitic ferrite phase or an acicular ferrite phase). The as-quenched hardness of a mainly bainite microstructure is slightly lower than that of a mainly martensite microstructure and easily changes due to the cooling rate. There is a tendency that the hardness will become high at a high cooling rate (such as in surface layers to be more specific) and become lower than that in the surface layers at a low cooling rate (such as at the center of the wall to be more specific). Accordingly, for this composition system, the hardness distribution in the wall thickness direction tends to steeply increase toward the surface layers.

P: 0.020% or less

Phosphorus (P) is an element that decreases the sour resistance. Phosphorus (P) segregates in grain boundaries, induces intergranular cracking during hydrogen embrittlement, and decreases the SSC resistance among the sour resistance. Phosphorus (P) also decreases toughness. Thus, the P content in the present invention is preferably reduced as much as possible but a P content of 0.020% or less is an allowable range. Thus, the P content is preferably limited to 0.020% or less. While the P content is preferably reduced as much as possible, excessive reduction increases the steelmaking cost and thus from industrial viewpoints, the P content is preferably about 0.003% or more.

S: 0.003% or less

Sulfur (S) is present as an inclusion and decreases the sour resistance, in particular, the HIC resistance. Thus the S content is preferably reduced as much as possible. Since a raw material is rolled in a circumferential direction and a longitudinal direction in the piercing process of preparing a seamless pipe, it is seldom that the MnS becomes stretched in the rolling direction as in the case of steel plates and steel sheets and the HIC resistance is adversely affected. Accordingly, there is no need to excessively reduce the S content in the present invention. As long as the S content is 0.003% or less, the HIC resistance is not largely degraded and is within an allowable range. Accordingly, the S content is preferably limited to 0.003% or less.

Al: 0.01 to 0.08%

Aluminum (Al) is an element that acts as a deoxidizing agent and this effect is exhibited at an Al content of 0.01% or more. At an Al content exceeding 0.08%, aluminum binds with oxygen and inclusions (mainly oxides) remain in a cluster state, thereby degrading toughness. The increase in the amount of inclusions may cause surface defects. Accordingly, the Al content is preferably limited to be in the range of 0.01 to 0.08% and more preferably 0.05% or less.

Ti: 0.005 to 0.05%

Titanium (Ti) is added for the sole purpose of stabilizing nitrogen (N). The Ti content is adjusted based on the N content so that Ti does not remain after Ti stabilized nitrogen by forming TiN. In order to achieve such an effect, the Ti content needs to be 0.005% or more. At a Ti content exceeding 0.05%, TiN will increase in amount or in size and Ti forms sulfides, carbo-sulfides, and carbides which degrade toughness more severely than TiN. Accordingly, the Ti content is preferably limited to be in the range of 0.005 to 0.05%.

N: 0.005% or less

Nitrogen (N) combines with Ti to form TiN but the toughness tends to decrease as the TiN content increases. Accordingly, the N content is preferably reduced as much as possible. However, since extreme reduction increases the refining cost, the N content is preferably limited to 0.005% or less.

The Ti content and the N content are adjusted within the above-described ranges while satisfying expression (1):

$$N \leq Ti \times 14/48 \leq N+10 \tag{1}$$

(where Ti and N represent contents of respective elements (mass ppm)).

"Ti (ppm)×14/48" corresponds to the amount of Ti used for forming TiN (in substantially all cases, the Ti/N ratio is 1.0 on an element ratio basis) and is limited to be within the range of N to (N+10) ppm so as to satisfy expression (1). At a "Ti (ppm)×14/48" less than N (ppm), solute nitrogen is present and bonds to nitride-former elements such as Al or forms carbo-nitrides instead of carbides during tempering, thereby degrading mechanical and/or corrosion properties of the seamless pipe. In contrast, if "Ti (ppm)×14/48" exceeds (N+10) ppm, a particular amount of Ti remains after formation of TiN and sulfides and carbo-sulfides are formed, which increases the risk of degrading toughness. Accordingly, the relationship between the Ti content and the N content is adjusted to satisfy expression (1).

The above-described components are basic components. In addition to these basic components, at least one selected from Cr: 0.5% or less, Mo: 0.3% or less, Ni: 0.3% or less, Cu: 0.3% or less, V: 0.05% or less, and Nb: 0.05% or less, and/or Ca: 0.002% or less may be selected and contained as needed.

At least one selected from Cr: 0.5% or less, Mo: 0.3% or less, Ni: 0.3% or less, Cu: 0.3% or less, V: 0.05% or less, and Nb: 0.05% or less Cr, Mo, Ni, Cu, V, and Nb are all elements that contribute to increasing the strength of the steel pipe and may be contained as needed.

Cr: 0.5% or less

Chromium (Cr) contributes to increasing the strength of the steel pipe through improving hardenability. In order to achieve such an effect, the Cr content is preferably not less than 0.01%, which is the unavoidable impurity level. At a Cr content exceeding 0.5%, the hardness becomes excessively high and the sour resistance, in particular, the sour resistance of the welded zone, is degraded. Accordingly, when Cr is to be contained, the Cr content is preferably limited to 0.5% or less and more preferably 0.3% or less.

Mo: 0.3% or less

Molybdenum (Mo), as with Cr, contributes to increasing the strength of the steel pipe through improving the hardenability. In order to achieve such an effect, the Mo content is preferably not less than 0.001% which is the unavoidable impurity level. At a Mo content exceeding 0.3%, the hardness becomes excessively high and the sour resistance is degraded. In particular, addition of a large amount of Mo increases the strength of the welded zone and degrades the sour resistance of the welded zone. Accordingly, when Mo is to be contained, the Mo content is preferably limited to 0.3% or less and more preferably to 0.2% or less.

Ni: 0.3% or less

Nickel (Ni) contributes to increasing the strength of the steel pipe through solid solution strengthening and improving hardenability. In order to achieve such an effect, the Ni content is desirably not less than 0.01% which is the unavoidable impurity level. However, at a Ni content exceeding 0.3%, the strength becomes excessively high and the sour resistance is degraded. Accordingly when Ni is to be contained, the Ni content is preferably limited to 0.3% or less. In the case where the Cu content is 0.05% or more, the Ni content is preferably 0.5×Cu or more. As a result, generation of surface defects caused by Cu can be prevented.
Cu: 0.3% or less Copper (Cu) contributes to increasing the strength of the steel pipe through solid solution strengthening and improving hardenability. In order to achieve such an effect, the Cu content is desirably not less than 0.01% which is the unavoidable impurity level. At a Cu content exceeding 0.3%, however, the toughness is degraded and surface defects occur frequently. Accordingly, when Cu is to be contained, the Cu content is preferably limited to 0.3% or less. In the case where the Cu content is 0.05% or more, the Ni content is preferably 0.5×Cu or more. In this manner, generation of surface defects caused by Cu can be prevented.
V: 0.05% or less Vanadium (V) contributes to improving hardenability and increases the tempering softening resistance to thereby increase the strength of the steel pipe. These effects become notable when V is contained in an amount not less than 0.002%, which is the impurity level. At a V content exceeding 0.05%, coarse VN and V (CN) are formed and the toughness is likely to be decreased. Thus, when V is to be contained, the V content is preferably limited to 0.05% or less.
Nb: 0.05% or less Niobium (Nb) contributes to increasing the strength of the steel pipe through precipitation-strengthening caused by Nb precipitates. Nb also contributes to forming finer austenite grains and thereby improves the sour resistance. Such an effect is notable at a Nb content of 0.005% or more. At a Nb content exceeding 0.05%, the SCC resistance and the HIC resistance may be degraded. Accordingly, when Nb is to be contained the Nb content is preferably limited to 0.05% or less.
Ca: 0.002% or less Calcium (Ca) has a morphology control function of controlling the morphology of sulfides and oxides to round shapes and contributes to improving the HIC resistance. Ca also prevents nozzle clogging during continuous casting. In order to achieve these effects, the Ca content is preferably 0.001% or more. At a Ca content exceeding 0.002%, the amounts of Ca-based inclusions and precipitates are increased excessively and the toughness and the SCC resistance will be degraded. Accordingly, when Ca is to be contained, the Ca content is preferably limited to 0.002% or less. When round billets are not used in the production process, no Ca may be added.

The balance other than the components described above is Fe and unavoidable impurities.

The steel pipe of the present invention preferably has a microstructure that is mainly a bainite phase. The "microstructure that is mainly a bainite phase" refers to a microstructure that contains a bainitic ferrite phase, an acicular ferrite phase, and/or a martensite phase in addition to the bainite phase. The microstructure of the steel pipe encompassed by the present invention is preferably mainly (area fraction of 50% or more) a bainite phase but may contain a bainitic ferrite phase and/or an acicular ferrite phase, and/or a very small fraction of a martensite phase. In particular, the fraction of the martensite phase is very low and thus for the purposes of the present invention, the "microstructure that is mainly a bainite phase" also refers to a microstructure that includes a martensite phase since it is difficult to distinguish these phases with typical optical microscopic observation of a nital-etched sample.

The area fraction of the microstructure that is mainly a bainite phase is 50% or more and the higher the area fraction, the better. The microstructure of the steel pipe of the present invention preferably has a grain size number of No. 8 or higher and more preferably No. 9 or higher.

A second phase other than the bainite phase may slightly contain a ferrite phase (10% or less in terms of area fraction). The ferrite phase never occurs during a tempering process.

Next, a preferable method for producing the heavy wall and high strength seamless steel pipe of the present invention is described.

First, a crude steel pipe having the above-described composition is prepared.

The crude steel pipe is preferably a seamless steel pipe of a particular size prepared by heating the steel pipe material (round strand, round billet etc.) described above and conducting piercing rolling and elongation rolling by a Mannesmann-type pipe forming method or the like, but is not limited to this.

In the present invention, the resulting seamless steel pipe is used as a crude steel pipe and the crude steel pipe can be subjected to a quenching treatment and a tempering treatment so as to form a product steel pipe having a yield strength exceeding 450 MPa.

The quenching treatment is a treatment of conducting heating followed by rapid cooling.

The heating in the quenching treatment is preferably a treatment of holding a heating temperature equal to or higher than the Ac3 transformation point in an air atmosphere for 120 seconds or more.

Here, the "in an air atmosphere" means that the heat treatment is conducted in an air environment (oxygen concentration: about 20%) and not by supplying a gas having a particular composition to the operating heat treatment furnace. For example, when an electric furnace is used as the heat treatment furnace, the heat treatment can be conducted in an atmosphere that is close to the gas composition (oxygen concentration: about 20%) of air. For a heating furnace that uses as a heat source combustion heat of $CH_4$, $C_2H_8$, CO, or the like, since oxygen is consumed during combustion, the oxygen concentration in the atmosphere decreases to about 10% or less but does not reach zero.

When the heating temperature is less than the Ac3 transformation point, the heating temperature is too low to generate an austenite single phase microstructure and a desired strength cannot be attained even after the subsequent rapid-cooling treatment. At a temperature exceeding 950° C., the crystal grains become coarse and the desired low-temperature toughness cannot be achieved. Thus, the heating temperature for quenching is preferably equal to or higher than the Ac3 transformation point and 950° C. or less, and more preferably 850° C. or more and 920° C. or less.

When the crude steel pipe is heated at the aforementioned temperature for the aforementioned holding time in an air atmosphere, decarburization occurs from the surfaces and thus the hardness of the surface layers remains at the desired 250 HV5 or less even after rapid cooling after heating. Decarburization from the surfaces is insufficient if the holding time is less than 120 seconds and the surface layer hardness after rapid cooling cannot be controlled to a desired level of 250 HV5 or less.

In order to form a steel pipe having an M-shape hardness distribution in the wall thickness direction, the heating in the air atmosphere for the quenching treatment is preferably conducted in an atmosphere having an oxygen concentration close to air (about 20%) or an oxygen concentration of at least about 5% by holding the heating temperature described above for 300 seconds or more. During the heating for quenching, decarburization of the surface layers is insufficient if the holding time is less than 300 seconds and the M-shape hardness distribution in the wall thickness direction may not be formed. In order to form a steel pipe having an M-shape hardness distribution in the wall thickness direction and exhibiting a Vickers hardness $HV_S$ of 250 HV5 or less at the pipe surface layers, the quenching heating temperature is preferably held for 300 seconds or more.

The upper limit of the heating holding time (the time in the soaking area) is preferably 5400 seconds or less from the viewpoint of productivity. If the time is more than 5400 seconds, the heat treatment time is long and the productivity is degraded. Accordingly, the heat holding time is limited to 120 seconds or more and preferably 300 seconds or more and preferably 5400 seconds or less and more preferably 3600 seconds or less.

The heating for quenching is preferably performed by injecting the pipe in a heating furnace and heating the pipe in the air atmosphere from the viewpoint of forming an M-shape hardness distribution in the wall thickness direction and decarburization from the surfaces. Instead of injecting the pipe in a heating furnace, the pipe may be heated by an induction heating method in an air atmosphere or an electric resistance heating. Note that in such a case, the atmosphere during heating is an atmosphere having an oxygen concentration substantially equal to that of air.

The crude steel pipe heated under the above-described conditions are then rapidly cooled. The rapid cooling is preferably water-cooling in a nucleate boiling state. Normally, the surface layers rapidly cooled by cooling in a nucleate boiling state undergo significant hardening. However, a steel pipe subjected to the above-mentioned heating treatment does not undergo significant hardening at the surface layers. Rather, the hardness of the surface layers decreases and an M-shape hardness distribution in the wall thickness direction in which the maximum hardness is observed at the middle is exhibited. In this manner, the hardness of the surface layers that come into contact with a corrosion environment and affect the sour resistance decreases and the sour resistance is improved.

It should be noted that, instead of water cooling in a nucleate boiling state, the rapid cooling may be performed by immersing the pipe in a water bath to conduct water cooling in a film boiling state for a predetermined time and then performing water cooling in a nucleate boiling state. The predetermined time of the water cooling in a film boiling state is preferably 5 seconds or more. When such rapid cooling (water cooling in a film boiling state followed by water cooling in a nucleate boiling state) is conducted in addition to the heating under the above-described conditions, it becomes easier to adjust the hardness distribution to a desired hardness distribution in the wall thickness direction (M-shape).

This product steel pipe having a low surface layer hardness and an M-shape hardness distribution in the wall thickness direction does not undergo significant changes in mechanical properties measured by taking specimens from the steel pipe. The changes are little if any. This is because the change in hardness distribution in the wall thickness direction described above occurs only in the near surface area and the strength of the steel pipe interior which occupies the large part of the steel pipe and at which mechanical properties such as a tensile characteristic are measured remains substantially unchanged.

In the present invention, the crude steel pipe may be subjected to a quenching treatment under the heat conditions different from those described above. That is, the pipe may be heated in a non-oxidizing atmosphere at the Ac3 transformation point or higher and preferably 950° C. or less and then water-cooled in a nucleate boiling state. In this case, holding the heating temperature described above is not necessary. Since the heating for quenching is conducted in a non-oxidizing atmosphere, decarburization of the surface layers described above does not occur and the product steel pipe comes to have a U-shape hardness distribution in the wall thickness direction in which the hardness increases toward the surfaces. Accordingly, it is preferable to remove the high-hardness regions in the surface layers by machining or the like. As long as the composition is within the preferable composition range of the present invention, the surface layers to be removed by grinding are preferably about 0.3 mm to 0.7 mm from each surface in the wall thickness direction where the hardness is high. If grinding is performed over 0.7 mm, the wall becomes too thin and it becomes difficult to ensure the guaranteed product wall thickness. However, from the viewpoint of the sour resistance, the more the ground part, the better. The effect of grinding reaches saturation after about 1.5 mm of grinding on each side.

When the hardness distribution in the wall thickness direction has a U shape profile, the hardness tends to become lower as the pipe is ground from the surfaces. In many cases, the hardness distribution has steep slopes in the surface layers and thus grinding for 0.3 mm or more can adjust the measurable surface layer hardness $HV_S$ to 250 HV5 or less.

As a result, the hardness $HV_S$ of the pipe surface layer at which the hardness can be measured can be adjusted to 250 HV5 or less.

In the quenching treatment, quenching Q is normally performed once. Alternatively, for example, a QQ treatment of performing quenching Q twice or more can be performed. The crystal grains can be expected to be finer by repeating quenching.

In the present invention, a tempering treatment is preferably performed after the quenching treatment. The tempering treatment is for reducing the hardness achieved by the quenching treatment so as to adjust the strength and toughness to desired levels. The tempering treatment preferably includes heating the pipe to a temperature (tempering temperature) of 550° C. or more and the Ac1 transformation point or less and allowing the pipe to cool. At a tempering temperature less than 550° C., the temperature is too low to achieve the desired toughness. At a high temperature exceeding the Ac1 transformation point, the pipe is heated in a dual phase region. Thus, it becomes impossible to adjust the properties to desired levels.

The present invention will be further described by way of Examples.

EXAMPLES

Example 1

A molten steel having a steel A composition shown in Table 1 was processed in a vacuum furnace into small ingots (30 kg steel ingots, bottom: 100 mm square, top: 150 mm square). The small ingots were heated and hot-rolled with a laboratory roller into five types of hot-rolled sheets of different thicknesses so as to obtain test specimens with a thickness ranging from 9.5 to 41 mm. Front and back surfaces of these hot rolled sheets were ground with a milling machine to prepare hot rolled sheets with little variation in wall thickness.

A test specimen (100 mm in width×200 mm in length (rolling direction)) was taken from each hot rolled sheet and subjected to a quenching and tempering treatment under the conditions shown in Table 2. For quenching, the test specimen was held at a heating temperature of 890° C. for 5 minutes in an inert gas (argon gas) atmosphere and then immediately water-cooled in a nucleate boiling state. The water cooling in the "nucleate boiling state" here refers to a treatment of shaking the work (hot rolled sheet) held in a fixture in all directions in a water vessel so as to cool the test specimen without generating steam. Some test specimens were quenched through immersing the test specimens in a water vessel so as to water-cool them in a film boiling state for a predetermined period of time and then conducting water-cooling in a nucleate boiling state. For tempering, 650° C. was held for 5 minutes.

The quenching and tempering treatment performed on the hot rolled sheets is a simulation of a quenching and tempering treatment of steel pipes having various wall thicknesses. The hardness distribution in the wall thickness direction, tensile characteristics, and sour resistance of steel pipes having various wall thicknesses were estimated based on the results. The sour resistance was comprehensively evaluated through a four-point bending test, a HIC test, and Method-A test prescribed in NACE-TM0177. The testing methods were as follows.

(1) Hardness Distribution in Wall Thickness Direction

A test piece for hardness measurement was taken from the test specimen. The hardness HV5 was measured in accordance with the provisions of JIS Z 2244 with a Vickers hardness meter (load: 5 kgf) at a cross-section taken in the wall thickness direction. Measurement was conducted at 5 points at 0.5 mm intervals in the wall thickness direction from each surface layer (0.5 mm from the surface) of a test specimen and at points at 3 mm or 4 mm intervals in the wall thickness center direction across the entire wall thickness. In the case where the measurement (at 5 points) in each surface layer could not be performed in a straight line, measurement was performed in a zigzag pattern (refer to FIG. 4). In the case where the hardness under a 5 kgf load (test load: 49 N) could be measured at a position 0.5 mm from the surface, the hardness at that position was assumed to be the hardness $HV_S$ of the surface layer (pipe surface layer) at which the measurement under a 5 kgf load (test load: 49 N) can be performed. In the case where the hardness under a 5 kgf load (test load: 49 N) could not be measured at that position, the next outermost or innermost position at which the hardness under a 5 kgf load (test load: 49 N) could be measured was assumed to be the position of the surface layer that can be measured under a 5 kgf load (test load: 49 N). For the hot rolled sheets having a thickness of 24 mm, hardness measurement was performed as quenched. The obtained profile of the hardness distribution in the sheet thickness direction (wall thickness direction) was then evaluated as to whether it has a U shape, an M shape, or a flat shape.

(2) Tensile Test

A round bar tensile test piece (ASTM-1/4 piece: Specimen 3 (E8)) was taken from the test specimen in accordance with the provisions of ASTM E8/E8M-08 so that the tensile direction was the rolling direction and the center of the sheet in the thickness direction was at the center of the test piece, and a tensile test was performed. The tensile property (yield strength YS) was determined.

The strength grade of each test specimen was determined based on the observed yield strength YS. According to DNV-OS-F101 code, X80 grade ranges from YS of 675 to 550 MPa, X70 grade ranges from YS: 485 to 605 MPa, X65 grade ranges from YS: 450 to 570 MPa, and X60 grade ranges from YS: 415 to 565 MPa, with overlaps in YS between adjacent grades. Thus, in the present invention, specimens with YS: 550 MPa or more were assumed to be of the X80 grade, those with YS: less than 550 MPa but not less than 485 MPa were assumed to be of the X70 grade, those with YS: less than 485 MPa but not less than 450 MPa were assumed to be of the X65 grade, and those with YS: less than 450 MPa but not less than 415 MPa were assumed to be of the X60 grade for the sake of convenience.

(3) Four-point Bending Test

A four-point bending test piece (thickness: 5 mm×width 10 mm×length 75 mm) that included a surface layer was taken from the test specimen in accordance with the ISO-7539-2 standard so that the longitudinal direction of the test piece was the rolling direction and a four-point bending test was performed to evaluate the SSC resistance of the test piece that included a surface layer. A strain gauge is attached to a surface of a four-point bending test piece, and after it was confirmed that a predetermined stress (stress 85% of the yield strength of the standard lower limit) was loaded to the test piece, the strain gauge was removed. The four-point bending test piece was immersed for 720 hours in a test solution which is Solution A (aqueous solution of 5 mass % NaCl+0.5 mass % glacial acetic acid) (solution of 5% NaCl and 0.5% CH$_3$COOH) saturated with H$_2$S having a partial pressure of 0.1 MPa. Test pieces that did not undergo rupture after the immersion were rated ○ as having good SSC resistance and test pieces that underwent rupture were rated X.

The yield strength of the standard lower limit which serves as the reference of the load stress is 550 MPa for the X80 grade, 485 MPa for the X70 grade, 450 MPa for the X65 grade, and 415 MPa for the X60 grade.

(4) HIC Test

A HIC test piece was taken from the test specimen in accordance with NACE-TM0284 and a HIC test was performed. In the test, the test piece was immersed for 96 hours in a test solution which was Solution A (aqueous solution of 5 mass % NaCl+0.5 mass % glacial acetic acid) saturated with H$_2$S having a partial pressure of 0.1 MPa. After the immersion, a cross-section of the test piece was observed and CSR, CLR, and CTR were determined. Test pieces with CSR of 1% or less, CLR of 15% or less, and CTR of 3% or less were rated ○ as having good HIC resistance and test pieces that bailed to satisfy any of the CSR, CLR, and CTR were rated X.

(5) Method-A Test

A round bar test piece was taken from the test specimen in accordance with NACE-TM0177 so that the position at the center of the sheet came at the center of the test piece and the SSC resistance was evaluated. The test piece was immersed in a test solution which was Solution A (aqueous solution of 5 mass % NaCl+0.5 mass % glacial acetic acid) saturated with H$_2$S gas having a partial pressure of 0.1 MPa under a predetermined load (stress 85% of the yield strength of the standard lower limit) and whether rupture occurred before elapse of 720 hours was investigated. The yield strength of the standard lower limit was the same as those described in (3) Four-point bending test according to the grades. Based on the results, test pieces that did not undergo rupture during elapse of 720 hours and had no cracks when observed with a 10× magnification optical microscope at a test piece parallel portion were rated ○ as having good SSC resistance and other test pieces were rated X.

In the Method A test, not only the SSC resistance but also SOHIC resistance can be evaluated at the position where the test piece was taken.

The results are shown in Table 2.

The hardness distribution in the wall thickness direction of a steel sheet (steel pipe) having a composition of Steel No. A has a flat (-) shape when the wall thickness (sheet thickness) is thin (wall thickness: 9.5 mm and 15 mm), indicating the hardness is constant in the wall thickness direction. However, as the wall thickness increases, a U-shape hardness distribution is exhibited in the wall thickness direction. Note that, as shown by the test specimen No. 1C, the hardness distribution in the wall thickness direction after the tempering treatment is not significantly different from the hardness distribution after the quenching and the hardness distribution substantially the same as that after quenching is maintained. In the case where the hardness HV5 at the surface layer position (outermost position or the innermost position) that can be measured under a 5 kgf load (test load: 49 N) is 250 HV5 or less, both the HIC resistance and the SCC resistance are good. In test specimens No. 1E and No. 1F, the hardness HV5 at the surface layer position (outermost or innermost position) that can be measured exceeds 250 HV5. However, since the test specimens No. 1E and No. 1F are of the X60 strength grade, the load stress placed in the Method-A test and the four-point bending test is low, and a rating ○ is given in the Method-A test where a test piece taken from the center position of the sheet is used, and the SSC resistance and the SOHIC resistance in a general sense are evaluated as good. In contrast, in the four-point bending test of evaluating the surface layer portion, the rating X is given to test specimens No. 1E and No. 1F that have surface layers with high hardness.

Test specimens 2A and 2C were cooled in water bath in a film boiling state for 5 seconds and then cooled in a nucleate boiling state. Test specimen 2B was cooled in a water bath in a film boiling state for 10 seconds and then cooled in a nucleate boiling state. In other words, test specimens 2A, 2B, and 2C were first slowly cooled and then rapidly cooled. Although the hardness distribution is largely dependent on the wall thickness, these results suggest that the hardness distribution can be easily controlled to a desired distribution by combining such cooling controls.

Example 2

Molten steels having compositions of Steel B to I shown in Table 1 were processed in a vacuum furnace into small ingots (30 kg steel ingots, bottom: 100 mm square, top: 150 mm square). The small ingots were heated in a laboratory heating furnace and hot-rolled with a laboratory roller into hot rolled sheets having a thickness ranging from 22 to 30 mm. Some of the hot rolled sheets were machined at both surfaces to remove the surface scale.

The resulting hot rolled sheets were heated in a laboratory heat treatment furnace in an air atmosphere (oxygen concentration: about 20 vol %) or an argon gas (inert gas) atmosphere to conduct a quenching treatment of performing quenching under conditions shown in Table 3 and a tempering treatment of performing tempering under conditions shown in Table 3. After the tempering, the sheets were left to cool.

Some of the test specimens (hot rolled sheets) were wrapped in an stainless steel foil and heated in an air atmosphere. Some of the hot rolled sheets were heated by electric resistance heating in an air atmosphere (oxygen concentration: about 20 vol %). Some of the hot rolled sheets were subjected to the quenching treatment twice. Some of the hot rolled sheets were ground at both sides by 0.4 mm or 0.7 mm each side after the quenching treatment.

Cooling for the quenching treatment included water-cooling in a nucleate boiling region or a film boiling region. The hot rolled sheets that were wrapped in a stainless steel foil and heat-treated were water-cooled after removing the stainless steel foil. To be more specific, water cooling "in a nucleate boiling region" refers to a treatment of shaking the work (hot rolled sheet) held in a fixture in all directions in a water vessel so as to cool the hot rolled sheet without generating vapor bubbles. The water cooling "in a film boiling region" refers to a treatment of immersing (dipping) the work (hot rolled sheet) in a water vessel to conduct cooling, in other words, cooling that allows generation of steam.

A test specimen was taken from the hot rolled sheet subjected to the above-described quenching and tempering treatment and the hardness distribution in the wall thickness direction, the tensile property, and the sour resistance were estimated as in Example 1. The sour resistance was comprehensively evaluated through the four-point bending test, the HIC test, and the Method-A test. The test procedures were as in Example 1. In the case where the observed YS was less than 415 MPa, the load stress was set to (observed YS)×0.85 in the Method-A test prescribed in NACE-TM0177 code.

Moreover, a V-notch test piece was taken from the hot rolled sheet subjected to the above-described quenching and tempering treatment in accordance with JIS Z 2202 so that the longitudinal direction of the test piece was orthogonal (T direction as set forth in DNS-OS-F101 code) to the rolling direction and Charpy impact test was performed in accordance with JIS Z 2242 at a test temperature of −40° C. to determine the absorption energy $_vE_{-40}$ (J). Test pieces with $_vE_{-40}$ of 200 J or more were rated ○ as having good toughness and other test pieces were rated X.

The results are shown in Table 4.

In all examples of the present invention, the hardness at the surface layer position that can be measured under a 5 kgf load (test load: 49 N) is 250 HV5 or less, the maximum hardness was 250 HV5 or less, and the sour resistance is significantly improved. In contrast, in comparative examples outside the range of the present invention, either the hardness at the surface layer position that can be measured under a 5 kgf load (test load: 49 N) exceeds 250 HV5 or the maximum hardness exceeds 250 HV5, thereby exhibiting lower sour resistance.

Since the surface layers are decarburized by heating in an air atmosphere (oxygen concentration: about 20 vol %) and are removed due to scale formation, the hardness distribution has an M-shape profile. In contrast, decarburization of the surface layers and formation of scale do not occur by heating in an argon gas atmosphere. Thus, the hardness distribution is adjusted have a U-shape profile.

In steel sheets No. 2 and No. 4 (comparative examples), the heating atmosphere for the quenching treatment is non-oxidizing atmosphere. Thus, the hardness at the surface layer position that can be measured under a 5 kgf load (test load: 49 N) exceeded 250 HV5. Thus, in a four-point bending test that uses a test piece that includes a surface layer, rupture occurred within 720 hours after the start of the immersion.

In steel sheet No. 5 (comparative example), the heating atmosphere of the quenching treatment is an air atmosphere; however, the holding time at the heating temperature is insufficient and decarburization near the surface is insufficient. Thus, the hardness of the surface layer position that can be measured under a 5 kgf load (test load: 49 N) exceeds 250 HV5. As a result, in a four-point bending test that uses a test piece that includes a surface layer, rupture occurred within 720 hours after the start of the immersion. In steel sheets No. 9 and No. 12 (comparative examples), decarburization near the surface is insufficient since the heating atmosphere for the quenching treatment is not a non-oxidizing atmosphere and the hardness measured at the surface layer position that can be measured under a 5 kgf load (test load: 49 N) exceeded 250 HV5. As a result, in a four-point bending test that uses a test piece that includes a surface layer, rupture occurred within 720 hours after the start of the immersion. In steel sheet No. 14 (comparative example), a desired high strength is not achieved since the cooling for quenching is performed relatively slowly. Steel sheet No. 19 does not satisfy expression (1) since the Ti content is excessively large with respect to the relationship between Ti and N and large amounts of Ti-based inclusions and precipitates, such as TiS and $Ti_4C_2S_2$, are generated. The toughness decreased presumably due to this reason although the strength, hardness, and the sour resistance were satisfactory.

Example 3

Molten steels having compositions of steels A and J to M shown in Table 1 were processed in a converter into slabs (steel with wall thickness of 250 mm) by continuous casting and the slabs were hot-rolled into round (diameter: 150 mm or 200 mm) billets (steel pipe material). The billets were heated, and pierced and rolled in a Mannesmann piercer mill into hollow works, and the hollow works were stretched and rolled in an Mannesmann piercer mill or the like to prepare crude steel pipes (seamless steel pipes) having dimensions shown in Table 3.

These crude steel pipes (seamless steel pipes) were subjected to a quenching treatment and a tempering treatment under conditions shown in Table 5. The quenching treatment included injecting the steel pipe in a heating furnace adjusted to have an atmosphere shown in Table 5, heating the steel pipe to a temperature shown in Table 5, holding the temperature for a length of time indicated in Table 5, and water-cooling the pipe under cooling conditions indicated in Table 5. The heating furnace used was a heating furnace that performs heating by burning natural gas. In such a case, although the atmosphere of the heating furnace is indicated to be "air", the atmosphere is actually the "air" atmosphere with an oxygen concentration of about 10 vol % or less. Since the heating furnace used was for actual operation, it takes as long as 1 to 2 hours for the temperature to reach the heating temperature. In the case where the holding time is as long as 600 seconds or more, surface decarburization occurs and an M-shape hardness distribution is rendered. Water cooling was performed in a nucleate boiling region. The tempering treatment included injecting the pipe in a heating furnace in an air atmosphere, holding the temperature indicated in Table 5 for a length of time indicated in Table 5, and then allowing the pipe to cool.

A test piece was taken from the seamless steel pipe. A hardness test, a tensile test, and a four-point bending test, a HIC test, and a Method-A test for evaluating the sour resistance were performed. A four-point bending test piece was taken so as include the inner surface of the steel pipe. The test procedures were as in Example 1. The results are shown in Table 6.

In all examples of the present invention, the hardness measured at the surface layer position that can be measured under a 5 kgf load (test load: 49 N) is 250 HV5 or less, the maximum hardness is also 250 HV5 or less, and the sour resistance is significantly improved. In contrast, in comparative examples outside the range of the present invention, the hardness at the surface layer position that can be measured under a 5 kgf load (test load: 49 N) exceeds 250 HV5 and the sour resistance is low.

In steel pipes No. 34 and No. 37 which are comparative examples, the hardness at the surface layer position that can be measured under a 5 kgf load (test load: 49 N) exceeds 250 HV5 since the heat holding time for the quenching treatment is shorter than a preferable range; and in a four-point bending test that uses a test piece that includes a surface layer, rupture occurred within 720 hours after the start of the immersion, thereby exhibiting low sour resistance. Toughness of the steel pipes Nos. 31, 32, 33, 35, and 36 other than the steel pipes Nos. 34 and 37 of comparative examples were evaluated. Only the steel pipe No. 35 showed a V-notch Charpy absorption energy of less than 200 J at −40° C., which is the evaluation standard. Thus, this steel pipe was assumed to be a comparative example. This is an example that does not satisfy the relationship between Ti and N contents and it is presumed that the toughness deteriorated due to insufficient immobilization of nitrogen with Ti, formation of nitrides, or any other reason.

TABLE 1

| Steel No. | C | Si | Mn | P | S | Al | Ti | N | Cr, Mo, V, Cu, Ni, Nb | Ca | Satisfy expression (1)*? |
|---|---|---|---|---|---|---|---|---|---|---|---|
| A | 0.072 | 0.24 | 1.41 | 0.009 | 0.0028 | 0.031 | 0.014 | 0.0035 | Cr: 0.005, Mo: 0.10, V: 0.049 | — | Yes |
| B | 0.091 | 0.29 | 1.59 | 0.015 | 0.0007 | 0.050 | 0.018 | 0.0049 | Cr: 0.21, Mo: 0.12, V: 0.051, Cu: 0.22, Nb: 0.012, Ni: 0.21 | 0.0052 | Yes |
| C | 0.068 | 0.49 | 1.31 | 0.002 | 0.0005 | 0.019 | 0.010 | 0.0024 | Cr: 0.10, Mo: 0.05, V: 0.045, Cu: 0.05, Ni: 0.04, Nb: 0.005 | — | Yes |
| D | 0.075 | 0.18 | 1.62 | 0.010 | 0.0042 | 0.028 | 0.012 | 0.0034 | Cr: 0.15, Mo: 0.12, V: 0.032, Cu: 0.04, Ni: 0.06, Nb: 0.008 | — | Yes |
| E | 0.110 | 0.32 | 0.73 | 0.009 | 0.0009 | 0.045 | 0.014 | 0.0031 | Cr: 0.03, Mo: 0.10, V: 0.035, Cu: 0.18, Ni: 0.15, Nb: 0.015 | — | Yes |
| F | 0.050 | 0.23 | 1.75 | 0.012 | 0.0013 | 0.021 | 0.015 | 0.0038 | Cr: 0.25, Mo: 0.11, V: 0.046, Cu: 0.23, Ni: 0.22, Nb: 0.022 | — | Yes |
| G | 0.075 | 0.15 | 1.73 | 0.008 | 0.0022 | 0.036 | 0.012 | 0.0025 | Cr: 0.08, Mo: 0.06, V: 0.061, Cu: 0.02, Ni: 0.04 | 0.0021 | Yes |
| H | 0.089 | 0.31 | 1.82 | 0.010 | 0.0030 | 0.045 | 0.020 | 0.0050 | Cr: 0.13, Mo: 0.12, V: 0.046 | — | Yes |
| I | 0.115 | 0.38 | 1.15 | 0.005 | 0.0051 | 0.040 | 0.031 | 0.0048 | Cr: 0.05, Mo: 0.08, V: 0.035, Cu: 0.01, Ni: 0.01 | — | No |
| J | 0.075 | 0.15 | 1.41 | 0.012 | 0.0023 | 0.042 | 0.014 | 0.0037 | Mo: 0.12, V: 0.043, Cu: 0.02, Ni: 0.03 | — | Yes |
| K | 0.087 | 0.27 | 1.56 | 0.010 | 0.0029 | 0.034 | 0.011 | 0.0028 | Cr: 0.18, Mo: 0.06, V: 0.053, Cu: 0.12, Ni: 0.09, Nb: 0.005 | — | Yes |
| L | 0.085 | 0.27 | 1.30 | 0.009 | 0.0030 | 0.043 | 0.021 | 0.0070 | Cr: 0.19, Mo: 0.12, V: 0.053, Cu: 0.08, Ni: 0.09, Nb: 0.005 | — | No |
| M | 0.092 | 0.29 | 1.23 | 0.008 | 0.0025 | 0.038 | 0.013 | 0.0037 | Cr: 0.08, Mo: 0.15, V: 0.044, Cu: 0.07, Ni: 0.05 | — | Yes |

*N ≤ Ti × 14/48 ≤ N + 10(1)

TABLE 2

| Test specimen No. | Steel No. | wall thickness (mm) | Quenching and tempering treatment | | | | | | | Hardness distribution in wall thickness direction Shape** | |
|---|---|---|---|---|---|---|---|---|---|---|---|
| | | | Quenching treatment | | | | Tempering treatment | | | | |
| | | | Heating temperature (° C.) | Heating atmosphere | Holding time (s) | Water cooling | Heating temperature (° C.) | Holding time (s) | After quenching | After tempering | |
| 1A | A | 9.5 | 890 | Argon gas | 300 | Nucleate boiling region | 650 | 300 | * | — |
| 2A | A | 9.5 | 890 | Argon gas | 300 | Nucleate boiling region after 5 s of film boiling region | 650 | 300 | — | — |
| 1B | A | 15 | 890 | Argon gas | 300 | Nucleate boiling region | 650 | 300 | * | — |
| 2B | A | 15 | 890 | Argon gas | 300 | Nucleate boiling region after 10 s of film boiling region | 650 | 300 | * | M |
| 1C | A | 24 | 890 | Argon gas | 300 | Nucleate boiling region | 650 | 300 | U | U |
| 2C | A | 24 | 890 | Argon gas | 300 | Nucleate boiling region after 5 s of film boiling region | 650 | 300 | * | M |
| 1D | A | 30 | 890 | Argon gas | 300 | Nucleate boiling region | 650 | 300 | * | U |
| 1E | A | 36 | 890 | Argon gas | 300 | Nucleate boiling region | 650 | 300 | * | U |
| 1F | A | 41 | 890 | Argon gas | 300 | Nucleate boiling region | 650 | 300 | * | U |

| Test specimen No. | Hardness distribution in wall thickness direction | | | Strength | | Sour resistance | | | | Reference |
|---|---|---|---|---|---|---|---|---|---|---|
| | Hardness of surface layer $HV_S$ | Maximum hardness $HV_{MAX}$ | Hardness at center position of wall $HV_{1/2}$ | Yield strength YS (MPa) | Grade | HIC test | Four-point bending test | Method-A test | Comprehensive evaluation | |
| 1A | 323 | 323 | 287 | 657 | X80 | ○ | X | ○ | X | Comparative Example |
| 2A | 240 | 245 | 243 | 602 | X80 | ○ | ○ | ○ | ○ | Example |
| 1B | 288 | 240 | 235 | 558 | X80 | ○ | ○ | ○ | ○ | Example |
| 2B | 201 | 215 | 198 | 488 | X70 | ○ | ○ | ○ | ○ | Example |
| 1C | 238 | 238 | 207 | 492 | X70 | ○ | ○ | ○ | ○ | Example |
| 2C | 220 | 240 | 201 | 533 | X70 | ○ | ○ | ○ | ○ | Example |
| 1D | 248 | 248 | 201 | 484 | X65 | ○ | ○ | ○ | ○ | Example |
| 1E | 266 | 266 | 179 | 449 | X60 | ○ | X | ○ | ○ | Comparative Example |
| 1F | 258 | 258 | 171 | 440 | X60 | ○ | X | ○ | ○ | Comparative Example |

* Not measured.
**Profile of hardness distribution in wall thickness direction: U-shape distribution (see FIG. 2), M-shape distribution (see FIG. 3), —: flat-shape distribution

TABLE 3

| Test specimen No. | Steel No. | wall thickness (mm) | Treatment before quenching | Quenching treatment | | | | Treatment after quenching | Tempering treatment | | Reference |
|---|---|---|---|---|---|---|---|---|---|---|---|
| | | | | Heating temperature (° C.) | Heating atmosphere | Holding time (s) | Water cooling | | Heating temperature (° C.) | Holding time (s) | |
| 1 | B | 30 | Machining at both surfaces (1.5 mm) | 900 | Air | 300 | Nucleate boiling region | — | 660 | 600 | Example |
| 2 | B | 30 | Machining at both surfaces (1.5 mm) | 900 | Argon | 300 | Nucleate boiling region | — | 660 | 600 | Comparative Example |
| 3 | B | 30 | Machining at both surfaces (1.5 mm) | (1) 900 (2) 900 | Air Air | 1800 300 | Nucleate boiling region Nucleate boiling region | — | 670 | 600 | Example |

TABLE 3-continued

| Test specimen No. | Steel No. | wall thickness (mm) | Treatment before quenching | Quenching treatment Heating temperature (° C.) | Heating atmosphere | Holding time (s) | Water cooling | Treatment after quenching | Tempering treatment Heating temperature (° C.) | Holding time (s) | Reference |
|---|---|---|---|---|---|---|---|---|---|---|---|
| 4 | B | 30 | Machining at both surfaces (1.5 mm) | (1) 900 (2) 900 | Argon Argon | 1800 300 | Nucleate boiling region Nucleate boiling region | — | 670 | 600 | Comparative Example |
| 5 | C | 30 | — | 900 | Air | 60 | Nucleate boiling region | — | 650 | 300 | Comparative Example |
| 6 | C | 30 | — | 900 | Air | 300 | Nucleate boiling region | — | 650 | 300 | Example |
| 7 | C | 30 | — | 900 | Air | 600 | Nucleate boiling region | — | 650 | 300 | Example |
| 8 | C | 30 | — | 900 | Air | 1200 | Nucleate boiling region | — | 650 | 300 | Example |
| 9 | D | 30 | — | 900 | Air (wrapped in SUS foil) | 480 | Nucleate boiling region | — | 660 | 600 | Comparative Example |
| 10 | D | 30 | — | 900 | Air (wrapped in SUS foil) | 480 | Nucleate boiling region | Machining at both surfaces (0.4 mm) | 660 | 600 | Example |
| 11 | D | 30 | — | 900 | Air (electric resistance heating) | 120 | Nucleate boiling region | — | 660 | 600 | Example |
| 12 | D | 30 | — | 900 | Argon | 480 | Nucleate boiling region | — | 660 | 600 | Comparative Example |
| 13 | D | 30 | — | 900 | Air | 480 | Nucleate boiling region | Machining at both surfaces (0.7 mm) | 660 | 600 | Example |
| 14 | D | 30 | — | 900 | Air | 600 | Film boiling region | — | 660 | 600 | Comparative Example |
| 15 | E | 30 | — | 890 | Air | 900 | Nucleate boiling region | — | 670 | 600 | Example |
| 16 | F | 25.4 | — | 920 | Air | 480 | Nucleate boiling region | — | 610 | 900 | Example |
| 17 | G | 22 | — | 890 | Air | 1500 | Nucleate boiling region | — | 650 | 600 | Example |
| 18 | H | 30 | — | 890 | Air | 600 | Nucleate boiling region | — | 650 | 600 | Example |
| 19 | I | 28 | — | 900 | Air | 700 | Nucleate boiling region | — | 660 | 600 | Example |

TABLE 4

| Test specimen No. | Steel No. | Shape* | Hardness distribution in wall thickness direction | | | Strength | | Toughness $_vE_{-40}$ (J) | Sour resistance | | | | Reference |
|---|---|---|---|---|---|---|---|---|---|---|---|---|---|
| | | | Hardness of surface layer $HV_S$ | Maximum hardness $HV_{MAX}$ | Hardness at center position of wall $HV_{1/2}$ | Yield strength YS (MPa) | Grade | | HIC test | Four-point bending test | Method-A test | Comprehensive evaluation | |
| 1 | B | M | 235 | 253 | 205 | 512 | X70 | ○ | ○ | ○ | ○ | ○ | Example |
| 2 | B | U | 273 | 273 | 198 | 510 | X70 | ○ | ○ | X | ○ | ○ | Comparative Example |
| 3 | B | M | 227 | 241 | 198 | 509 | X70 | ○ | ○ | ○ | ○ | ○ | Example |
| 4 | B | U | 269 | 269 | 201 | 514 | X70 | ○ | ○ | X | ○ | X | Comparative Example |
| 5 | C | U | 270 | 270 | 170 | 473 | X65 | ○ | ○ | X | ○ | X | Comparative Example |
| 6 | C | M | 230 | 255 | 168 | 470 | X65 | ○ | ○ | ○ | ○ | ○ | Example |
| 7 | C | M | 222 | 248 | 175 | 476 | X65 | ○ | ○ | ○ | ○ | ○ | Example |
| 8 | C | M | 216 | 235 | 172 | 472 | X65 | ○ | ○ | ○ | ○ | ○ | Example |
| 9 | D | U | 279 | 279 | 182 | 509 | X70 | ○ | ○ | X | ○ | X | Comparative Example |
| 10 | D | U | 248 | 248 | 180 | 508 | X70 | ○ | ○ | ○ | ○ | ○ | Example |
| 11 | D | — | 230 | 230 | 170 | 478 | X65 | ○ | ○ | ○ | ○ | ○ | Example |
| 12 | D | U | 262 | 262 | 178 | 499 | X70 | ○ | ○ | X | ○ | X | Comparative Example |
| 13 | D | U | 239 | 239 | 180 | 492 | X70 | ○ | ○ | ○ | ○ | ○ | Example |
| 14 | D | — | 126 | 126 | 124 | 316 | — | ○ | ○ | ○ | ○ | ○ | Comparative Example |
| 15 | E | M | 248 | 258 | 230 | 569 | X80 | ○ | ○ | ○ | ○ | ○ | Example |
| 16 | F | M | 217 | 240 | 219 | 504 | X70 | ○ | ○ | ○ | ○ | ○ | Example |
| 17 | G | M | 226 | 238 | 224 | 547 | X70 | ○ | ○ | ○ | ○ | ○ | Example |
| 18 | H | M | 230 | 240 | 226 | 543 | X70 | ○ | ○ | ○ | ○ | ○ | Example |
| 19 | I | M | 228 | 240 | 205 | 503 | X70 | X | ○ | ○ | ○ | ○ | Comparative Example |

*Profile of hardness distribution in wall thickness direction: U-shape distribution (see FIG. 2), M-shape distribution (see FIG. 3), —: flat-shape distribution

TABLE 5

| Steel pipe No. | Steel No. | Pipe size Outer diameter (mmφ) × wall thickness (mm) | Quenching treatment Heating temperature (° C.) | Heating atmosphere | Holding time (s) | Water cooling | Tempering treatment Heating temperature (° C.) | Holding time (s) | Reference |
|---|---|---|---|---|---|---|---|---|---|
| 31 | A | 324.0φ × 32 | 890 | Air | 600 | Nucleate boiling region | 650 | 600 | Example |
| 32 | J | 324.0φ × 25.4 | 890 | Air | 600 | Nucleate boiling region | 650 | 600 | Example |
| 33 | K | 269.9φ × 27.8 | 900 | Air | 1200 | Nucleate boiling region | 650 | 600 | Example |
| 34 | K | 244.4φ × 9.5 | 900 | Air | 90 | Nucleate boiling region | 650 | 600 | Comparative Example |
| 35 | L | 355.6φ × 30 | 910 | Air | 900 | Nucleate boiling region | 630 | 300 | Example |
| 36 | M | 355.6φ × 30 | 910 | Air | 1200 | Nucleate boiling region | 650 | 300 | Example |
| 37 | M | 324.0φ × 18 | 900 | Air | 110 | Nucleate boiling region | 650 | 300 | Comparative Example |

TABLE 6

| Steel pipe No. | Steel No. | Shape* | Hardness distribution in wall thickness direction Surface layer hardness HV5 Inner surface side | Outer surface side | Maximum hardness HV$_{MAX}$ | Hardness at center position of wall HV$_{1/2}$ | Strength Yield strength YS (MPa) | Grade | Sour resistance HIC test | Four-point bending test | Method-A test | Comprehensive evaluation | Reference |
|---|---|---|---|---|---|---|---|---|---|---|---|---|---|
| 31 | A | M | 179 | 187 | 208 | 187 | 446 | X60 | ○ | ○ | ○ | ○ | Example |
| 32 | J | M | 219 | 228 | 248 | 205 | 488 | X70 | ○ | ○ | ○ | ○ | Example |
| 33 | K | M | 237 | 248 | 270 | 231 | 567 | X80 | ○ | ○ | ○ | ○ | Example |
| 34 | K | — | 292 | 293 | — | 283 | 603 | X80 | ○ | X | ○ | X | Comparative Example |
| 35 | L | M | 229 | 231 | 249 | 229 | 550 | X80 | ○ | ○ | ○ | ○ | Comparative Example |
| 36 | M | M | 242 | 248 | 267 | 238 | 600 | X80 | ○ | ○ | ○ | ○ | Example |
| 37 | M | U | 286 | 298 | — | 248 | 550 | X80 | ○ | X | ○ | X | Comparative Example |

*Profile of hardness distribution in wall thickness direction: U-shape distribution (see FIG. 2), M-shape distribution (see FIG. 3), —: flat-shape distribution

The invention claimed is:

1. A seamless steel pipe having a yield strength exceeding 450 MPa and prepared by performing a quenching and tempering treatment, wherein a Vickers hardness HV5 that can be measured at an outermost side or an innermost side of the pipe under a 5 kgf load (test load: 49 N) is 250 HV5 or less.

2. The seamless steel pipe according to claim 1, wherein a hardness distribution across the entire region of the seamless steel pipe in a wall thickness direction has an M-shape profile.

3. The seamless steel pipe according to claim 1, wherein a hardness distribution across the entire region of the seamless steel pipe in a wall thickness direction has a U-shape profile.

4. The seamless steel pipe according to claim 2, wherein the hardness distribution across the entire region of the seamless steel pipe in a wall thickness direction has the M-shape profile and a maximum hardness in terms of a Vickers hardness HV5 measured under a 5 kgf load (test load: 49 N) is 250 HV5 or less.

5. The seamless steel pipe according to claim 1, wherein the seamless steel pipe has a composition that contains, in terms of mass %,
C: 0.03 to 0.15%, Si: 0.02 to 0.5%,
Mn: 0.7 to 2.5%, P: 0.020% or less,
S: 0.003% or less, Al: 0.01 to 0.08%,
Ti: 0.005 to 0.05%, N: 0.005% or less,
and the balance being Fe and unavoidable impurities, where Ti and N are contained to satisfy expression (1) below:

$$N \leq Ti \times 14/48 \leq N+10 \qquad (1)$$

where Ti and N represent contents of respective elements (mass ppm).

6. The seamless steel pipe according to claim 5, wherein the composition further contains, in terms of mass %, at least one selected from Cr: 0.5% or less, Mo: 0.3% or less, Ni: 0.3% or less, Cu: 0.3% or less, V: 0.05% or less, and Nb: 0.05% or less.

7. The seamless steel pipe according to claim 5, wherein the composition further contains, in terms of mass %, Ca: 0.002% or less.

8. A method for producing a seamless steel pipe, the method comprising performing a quenching treatment and a tempering treatment on a crude steel pipe so as to form a product steel pipe having a yield strength exceeding 450 MPa, wherein the crude steel pipe is a seamless steel pipe that has a composition that contains, in terms of mass %,
C: 0.03 to 0.15%, Si: 0.02 to 0.5%,
Mn: 0.7 to 2.5%, P: 0.020% or less,
S: 0.003% or less, Al: 0.01 to 0.08%,
Ti: 0.005 to 0.05%, N: 0.005% or less, and the balance being Fe and unavoidable impurities, where Ti and N are contained to satisfy expression (1) below:

$$N \leq Ti \times 14/48 \leq N+10 \quad (1)$$

where Ti and N represent contents of respective elements (mass ppm);

the quenching treatment includes performing heating at a temperature equal to or higher than the Ac3 transformation point and then performing rapid cooling; and after the quenching treatment, surface layers are ground from surfaces by a depth of 0.3 mm or more in a wall thickness direction and then the tempering treatment is performed.

9. A method for producing a seamless steel pipe, the method comprising performing a quenching treatment and a tempering treatment on a crude steel pipe so as to form a product steel pipe having a yield strength exceeding 450 MPa, wherein the crude steel pipe is a seamless steel pipe that has a composition that contains, in terms of mass %,
C: 0.03 to 0.15%, Si: 0.02 to 0.5%,
Mn: 0.7 to 2.5%, P: 0.020% or less,
S: 0.003% or less, Al: 0.01 to 0.08%,
Ti: 0.005 to 0.05%, N: 0.005% or less, and
the balance being Fe and unavoidable impurities, where Ti and N are contained to satisfy expression (1) below:

$$N \leq Ti \times 14/48 \leq N+10 \quad (1)$$

where Ti and N represent contents of respective elements (mass ppm); and the quenching treatment includes performing heating and then performing rapid cooling, the heating includes holding a heating temperature equal to or higher than the Ac3 transformation point for 120 seconds or more in an air atmosphere, and the rapid cooling includes performing a water-cooling treatment in a nucleate boiling region.

10. The method for producing a seamless steel pipe according to claim 9 wherein the rapid cooling includes, instead of performing the water-cooling treatment in a nucleate boiling region, performing water-cooling in a film boiling region and then performing water-cooling in a nucleate boiling region.

11. The method for producing a seamless steel pipe according to claim 8, wherein the heating is performed through a heating furnace injection system, an electric resistance heating system, or an induction heating system.

12. The method for producing a seamless steel pipe according to claim 8, wherein the composition further contains, in terms of mass %, at least one selected from Cr: 0.5% or less, Mo: 0.3% or less, Ni: 0.3% or less, Cu: 0.3% or less, V: 0.05% or less, and Nb: 0.05% or less.

13. The method for producing a seamless steel pipe according to claim 8, wherein the composition further contains, in terms of mass %, Ca: 0.002% or less.

14. The seamless steel pipe according to claim 6, wherein the composition further contains, in terms of mass %, Ca: 0.002% or less.

15. The method for producing a seamless steel pipe according to claim 9, wherein the composition further contains, in terms of mass %, at least one selected from Cr: 0.5% or less, Mo: 0.3% or less, Ni: 0.3% or less, Cu: 0.3% or less, V: 0.05% or less, and Nb: 0.05% or less.

16. The method for producing a seamless steel pipe according to claim 9, wherein the composition further contains, in terms of mass %, Ca: 0.002% or less.

17. The method for producing a seamless steel pipe according to claim 12, wherein the composition further contains, in terms of mass %, Ca: 0.002% or less.

18. The method for producing a seamless steel pipe according to claim 15, wherein the composition further contains, in terms of mass %, Ca: 0.002% or less.

* * * * *